(12) United States Patent
Guo et al.

(10) Patent No.: US 12,094,503 B1
(45) Date of Patent: Sep. 17, 2024

(54) CONTINUOUS FREQUENCY SERVO IN A DATA STORAGE DEVICE

(71) Applicant: WESTERN DIGITAL TECHNOLOGIES, INC., San Jose, CA (US)

(72) Inventors: Guoxiao Guo, San Jose, CA (US); Jason Laks, San Jose, CA (US); Charles A. Park, San Jose, CA (US); Scott A. Ottele, San Jose, CA (US); Gary Herbst, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/364,759

(22) Filed: Aug. 3, 2023

Related U.S. Application Data

(60) Provisional application No. 63/508,796, filed on Jun. 16, 2023.

(51) Int. Cl.
   *G11B 5/55* (2006.01)
(52) U.S. Cl.
   CPC .................................. *G11B 5/5547* (2013.01)
(58) Field of Classification Search
   None
   See application file for complete search history.

(56) References Cited

U.S. PATENT DOCUMENTS

| | | | | |
|---|---|---|---|---|
| 5,384,671 A | * | 1/1995 | Fisher | G11B 20/10009 |
| 5,475,540 A | * | 12/1995 | Gold | G11B 27/3027 360/48 |
| 6,262,857 B1 | * | 7/2001 | Hull | G11B 27/3027 360/48 |
| 6,411,459 B1 | | 6/2002 | Belser et al. | |
| 6,738,205 B1 | * | 5/2004 | Moran | G11B 5/865 360/75 |
| 6,873,482 B1 | | 3/2005 | Hsieh et al. | |
| 7,190,546 B2 | | 3/2007 | Ehrlich | |
| 7,391,584 B1 | * | 6/2008 | Sheh | G11B 5/59661 360/75 |
| 7,929,238 B1 | | 4/2011 | Vasquez | |
| 8,531,794 B2 | * | 9/2013 | Nonaka | G11B 5/59688 360/48 |
| 8,542,455 B2 | * | 9/2013 | Huang | G11B 5/596 360/27 |

(Continued)

OTHER PUBLICATIONS

Kun et al. (2017) Servo Pattern Enhancements for High Areal Density Hard Disk Drives, [Doctor of Philosophy Thesis] Nanyang Technological University, School of Electrical & Electronic Engineering.

*Primary Examiner* — Fred Tzeng
(74) *Attorney, Agent, or Firm* — Patent Law Works LLP

(57) ABSTRACT

Example storage medium servo patterns, data storage devices, and methods to provide servo tracks with continuously varying frequency in a data storage device are described. The data storage device may include storage media, such as magnetic disks, having servo sectors that define servo tracks, where adjacent servo tracks have continuously varying frequency as the head moves from one servo track to the next. As the head is actuated over the storage medium, a target track frequency may be determined based on the radial position of a target servo track and the channel frequency may be set to the target track frequency to follow the target servo track.

20 Claims, 8 Drawing Sheets

(56) References Cited

U.S. PATENT DOCUMENTS

| | | | |
|---|---|---|---|
| 8,619,379 B2 * | 12/2013 | Nonaka | G11B 20/1258 |
| | | | 360/48 |
| 8,625,219 B2 | 1/2014 | Nonaka et al. | |
| 8,630,051 B2 * | 1/2014 | Nonaka | G11B 20/1258 |
| | | | 360/48 |
| 8,724,245 B1 | 5/2014 | Smith et al. | |
| 8,792,202 B1 * | 7/2014 | Wan | G11B 5/596 |
| | | | 369/47.28 |
| 8,970,979 B1 * | 3/2015 | Jia | G11B 5/59622 |
| | | | 360/75 |
| 9,437,242 B1 * | 9/2016 | Banh | G11B 5/59688 |
| 9,905,256 B1 * | 2/2018 | Asakura | G11B 5/59655 |
| 10,056,100 B1 | 8/2018 | Asakura | |
| 10,777,224 B2 | 9/2020 | Ellis et al. | |
| 10,803,894 B2 * | 10/2020 | Kuwahara | G11B 5/5526 |
| 2010/0328804 A1 * | 12/2010 | Yamashita | G11B 5/09 |
| 2013/0010382 A1 * | 1/2013 | Nonaka | G11B 5/59688 |

* cited by examiner

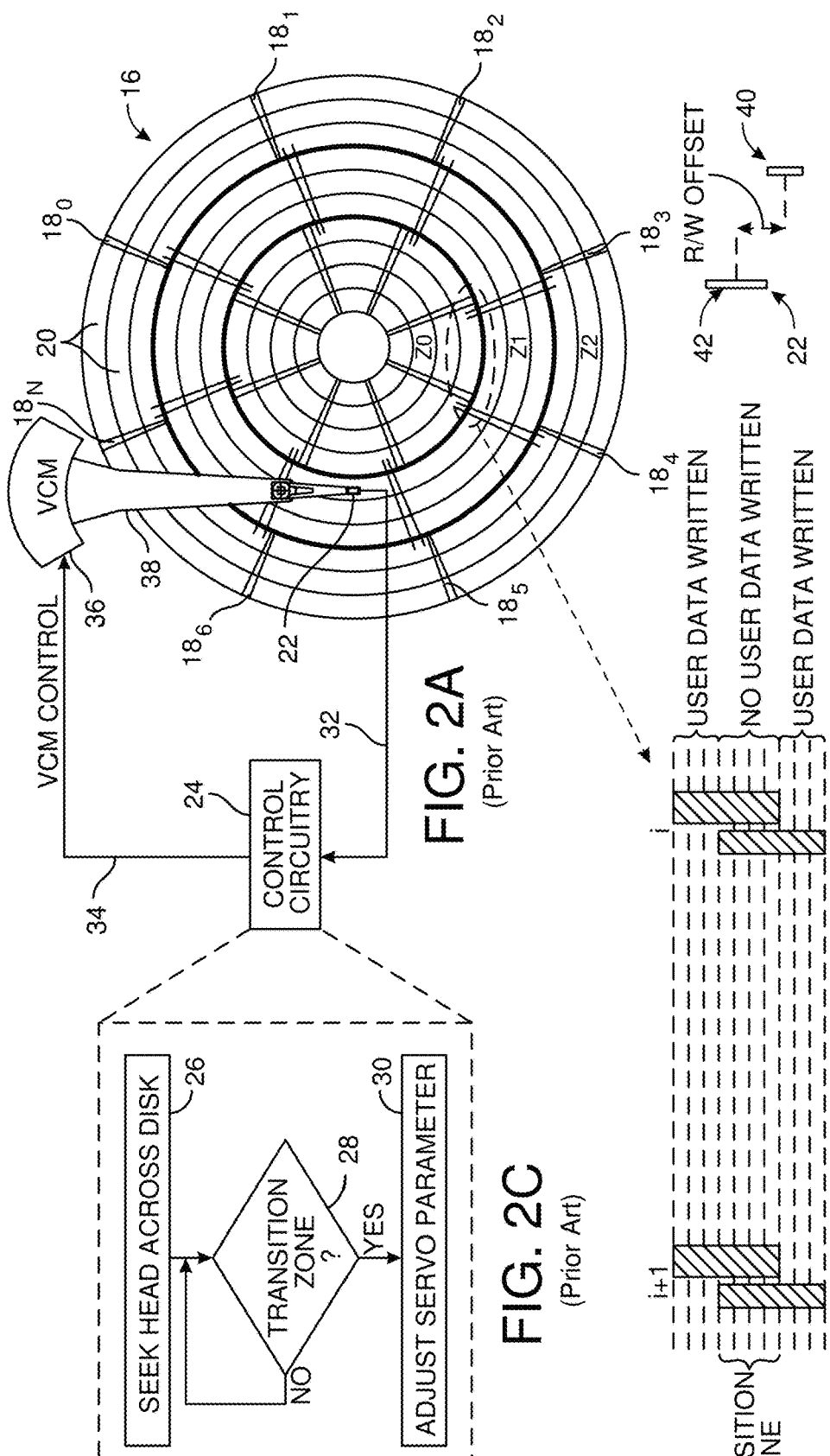

CONTINUOUS FREQUENCY SERVO IN A DATA STORAGE DEVICE

TECHNICAL FIELD

The present disclosure relates to servo control for data storage devices. In particular, the present disclosure relates to using continuously varying frequency servo patterns across the surface of a storage medium.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (Z0) to the outer diameter of the disk (Z2).

The prior art disk format of FIG. 1A also comprises a number of servo sectors $6_0$-$6_N$ recorded around the circumference of the disk 2 that define a plurality of servo tracks, wherein the data tracks 4 are defined relative to the servo tracks. Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

To facilitate demodulating the servo sectors $6_0$-$6_N$, a timing control loop generates a disk locked clock synchronized to the data rate of the servo sectors $6_0$-$6_N$. The disk locked clock generates suitable timing information, such as a servo gate that times the circumferential location of the servo sectors $6_0$-$6_N$, and a sync window that times the circumferential location of the sync marks 10 within the servo sectors $6_0$-$6_N$ as shown in FIG. 1B.

In the example of FIG. 1A, the data rate of the servo sectors $6_0$-$6_N$ changes in each physical zone similar to the data sectors in order to improve format efficiency. However, a zoned servo sector format may be problematic when a seek operation crosses a servo zone boundary. For example, if the location of a servo zone boundary is estimated incorrectly (too early or too late), the disk drive can lose synchronization to the servo sectors due to incorrect adjustments to servo control parameters, such as an incorrect adjustment to the servo gate, or an incorrect adjustment to the sync window, or an incorrect adjustment to the timing control loop that synchronizes the disk locked clock to the data rate of the servo sectors.

An example solution to the problem of transitions between zoned servo configurations is further described below with regard to FIGS. 2A-2D. A transition zone may be added between adjacent servo zones to adjust servo parameters when the head moves across them. This may solve loss of servo synchronization when crossing zone boundaries, but at a cost to format efficiency because the transition zones do not store user data.

There is a need for technology that improves format efficiency through adjustments in servo frequency with finer granularity. There is also a need for technology that eliminates the need for transition zones between servo zones of different frequencies.

SUMMARY

Various aspects for data storage devices with servo tracks having continuously varying frequencies across adjacent tracks in the radial direction are described, particularly servo zones that have a coarse channel frequency for locating a servo track and track-based channel frequencies mapped to the servo track address.

One general aspect includes a data storage device that includes: a storage medium that includes a plurality of servo sectors defining a plurality of servo tracks, where a plurality of adjacent servo tracks is configured with continuously varying frequencies across the plurality of adjacent servo tracks; a head actuated over the storage medium for reading the plurality of servo tracks; and a control circuitry. The control circuitry is configured to: determine, based on a radial position of a target servo track, a target track frequency from among the continuously varying frequencies; set a channel frequency to the target track frequency; and follow, using the target track frequency, the target servo track.

Implementations may include one or more of the following features. The storage medium may further include a plurality of servo zones comprised of adjacent servo tracks; the control circuitry may be further configured to determine, based on a target servo zone for the target servo track, a coarse target frequency, and set the channel frequency to the coarse target frequency during a seek operation for the target servo track; and the target track frequency may be within a channel phase lock range of the coarse target frequency. The plurality of servo sectors for the target track may include a target track address and the control circuitry may be further configured to: determine, based on the target track address, the target track frequency; and update, responsive to determining the target track address, the channel frequency to the target track frequency. The control circuitry may be further configured to map a plurality of track addresses to continuously varying frequencies within a frequency range defined for a corresponding servo zone of the plurality of servo zones. The plurality of servo zones may include at least four servo zones; each servo zone of the plurality of servo zones may have a different coarse target frequency; and adjacent servo zones of the plurality of servo zones may provide continuous user data tracks without an intervening transition zone. The continuously varying frequencies may have a step size selected from a range greater than zero and less than 0.005 of a nominal channel frequency. The control circuitry may be further configured to, during a seek operation, use at least two consecutive servo sectors to determine a wedge-to-wedge time for reading the target servo track. The storage medium may further include a first sync track having a first sync track frequency, a first sync track address, and a predetermined distance from an outer diameter of the storage medium; and the control circuitry may be further configured to, during a frequency synchronization operation: set the channel frequency to the first sync track frequency; load the head over the storage medium; and sweep the head over the storage medium until the first sync track address is detected. The control circuitry may be further configured to, during a frequency synchronization recovery operation: set the channel frequency to a base synchronization recovery frequency; move the head over the storage medium toward an inner diameter crash stop; sweep the head over the storage medium; and vary the channel frequency from the base synchronization recovery frequency until synchronization is established and a synchronization track address is detected, or the inner diameter crash stop is reached. The storage medium may further include a butterfly seam where a set of outer diameter servo tracks and a set of inner diameter servo tracks meet; the butterfly seam may include gray code written at a writer width of the head and a null-burst pattern that is different from null-burst patterns of the plurality of servo tracks; and the butterfly seam may have a known frequency pattern.

Another general aspect includes a method that includes: actuating a head over a storage medium for reading a plurality of servo tracks, where the storage medium may include a plurality of servo sectors defining the plurality of servo tracks and a plurality of adjacent servo tracks is configured with continuously varying frequencies across the plurality of adjacent servo tracks; determining, based on a radial position of a target servo track, a target track frequency from among the continuously varying frequencies; setting a channel frequency to the target track frequency; and following, using the target track frequency, the target servo track.

Implementations may include one or more of the following features. The method may include: determining, based on a target servo zone for the target servo track, a coarse target frequency, where the storage medium further may include a plurality of servo zones may include of adjacent servo tracks; and setting a channel frequency to the coarse target frequency during a seek operation for the target servo track, where the target track frequency is within a channel phase lock range of the coarse target frequency. The method may include determining, based on a target track address, the target track frequency, where plurality of servo sectors for the target track includes the target track address; and updating, responsive to determining the target track address, the channel frequency to the target track frequency. The method may include: mapping a plurality of track addresses to continuously varying frequencies within a frequency range defined for a corresponding servo zone of the plurality of servo zones. The continuously varying frequencies have a step size selected from a range greater than zero and less than 0.005 of a nominal channel frequency. The method may include, during a seek operation: using at least two consecutive servo sectors to determine a wedge-to-wedge time for reading the target servo track. The method may include, during a frequency synchronization operation: setting a channel frequency to a first sync track frequency, where the storage medium may further include a first sync track having the first sync track frequency, a first sync track address, and a predetermined distance from an outer diameter of the storage medium; loading the head over the storage medium; and sweeping the head over the storage medium until the first sync track address is detected. The method may include, during a frequency synchronization recovery operation: setting the channel frequency to a base synchronization recovery frequency; moving the head over the storage medium toward an inner diameter crash stop; sweeping the head over the storage medium; and varying the channel frequency from the base synchronization recovery frequency until synchronization is established and a synchronization track address is detected, or the inner diameter crash stop is reached. The method may include moving the head across a butterfly seam on the storage medium without losing servo timing, where: the butterfly seam is located where a set of outer diameter servo tracks and a set of inner diameter servo tracks meet; the butterfly seam may include gray code written at a writer width of the head and a null-burst pattern that is different from null-burst patterns of the plurality of servo tracks; and the butterfly seam has a known frequency pattern.

Still another general aspect includes a data storage device that includes: a storage medium that includes a plurality of servo sectors defining a plurality of servo tracks, where a plurality of adjacent servo tracks is configured with continuously varying frequencies across the plurality of adjacent servo tracks; a head actuated over the storage medium for reading the plurality of servo tracks; means for determining, based on a radial position of a target servo track, a target track frequency from among the continuously varying frequencies; and means for setting a channel frequency to the target track frequency; and means for following, using the target track frequency, the target servo track.

The present disclosure describes various aspects of innovative technology capable of improving format efficiency and related capacity and/or reliability gains. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage device capacity, such as by using continuously varying frequencies radially across adjacent servo tracks for increased servo wedge efficiency and reduced transition zones. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIGS. 2A and 2B are diagrams of a prior art data storage device in the form of a disk drive comprising a head actuated over a disk surface, the disk comprising overlapping zoned servo sectors.

FIG. 2C is a flow diagram of a prior art method for adjusting servo parameters in response to transition zones between servo zones.

FIG. 2D is a diagram of a prior art head comprised of a read element and a write element separated by a radial offset for use in conjunction with the examples of FIGS. 2A-2C.

DETAILED DESCRIPTION

Figure 1A:
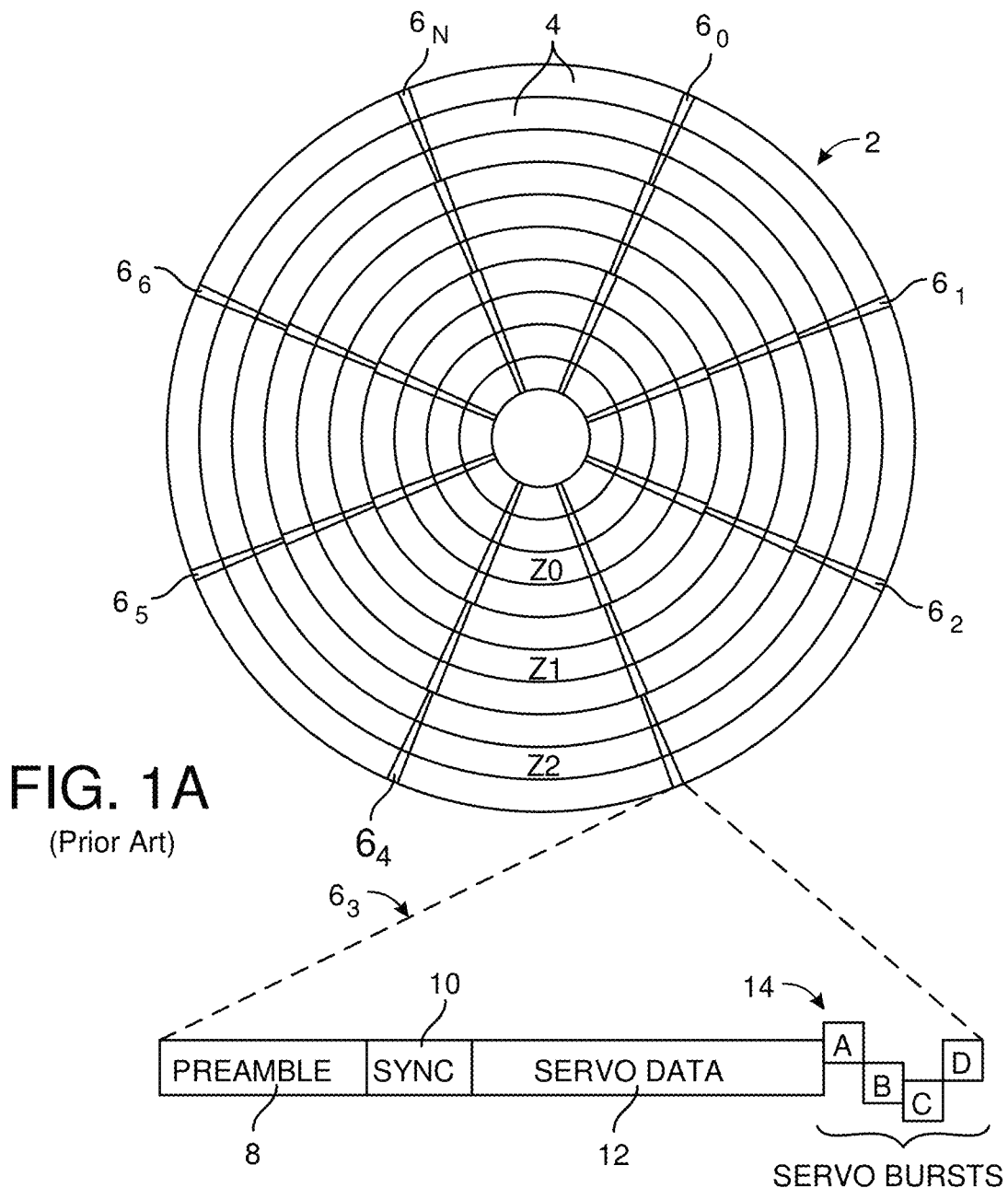
FIG. 1A is a diagram of a prior art disk format comprising a plurality of servo zones defined by servo sectors recorded at varying data rates.

FIG. 2A shows a prior art disk drive comprising a disk 16 comprising a plurality of servo sectors $18_0$-$18_N$ defining a plurality of servo tracks 20. The servo tracks 20 form a plurality of servo zones (e.g., Z0-Z2) wherein a servo data rate or servo frequency of servo sectors in a first servo zone is different than a servo data rate or servo frequency of servo sectors in a second servo zone. Referring to FIG. 2B, a boundary of a first servo zone overlaps with a boundary of a second servo zone over a transition zone, and the servo sectors of the first servo zone are interleaved with the servo sectors of the second servo zone within the transition zone. A head 22 is actuated radially over the disk 16, and control circuitry 24 is operable to execute the flow diagram of FIG. 2C, wherein when seeking the head 22 across the disk 16 (block 26), at least one servo parameter is adjusted (block 30) when the head is over the transition zone (block 28) in order to transition between the first servo zone and the second servo zone.

In the embodiment of FIG. 2A the control circuitry 24 processes a read signal 32 emanating from the head 22 to demodulate the servo sectors $18_0$-$18_N$ and generate a position error signal (PES) representing an error between the actual position of the head and a target position relative to a target track in a track follow operation. The control circuitry 24 filters the PES using suitable compensation filters to generate a control signal 34 applied to a voice coil motor (VCM) 36 which rotates an actuator arm 38 about a pivot, thereby actuating the head 22 radially over the disk 16 in a direction that reduces the PES. The servo sectors $18_0$-$18_N$ may comprise any suitable position information, such as a track and wedge address for coarse positioning and servo bursts for fine positioning as described above with reference to FIG. 1A. The servo bursts may comprise any suitable pattern, such as an amplitude based servo pattern as shown in FIG. 1A, or a suitable phase based servo pattern.

Varying the servo data rate across the servo zones (by increasing the servo data rate toward the outer diameter servo zones) increases the capacity of the disk 16 by reducing the area consumed by the servo sectors. In prior art, servo zone crossing during a seek operation is facilitated by recording the servo sectors so they overlap by a controlled amount at the servo zone boundaries as illustrated in FIG. 2B. The overlapping servo sectors may be interleaved within the transition zone such that the servo sectors of each servo zone pass under the head 22 in an alternating sequence. This is accomplished by recording the servo sectors with a circumferential offset between servo zones as illustrated in FIG. 2B. While the head 22 is within the transition zone during a seek operation, at least one servo parameter is adjusted in order to transition between the servo zones. While this may be effective for adjusting for a relatively large change in servo data rate or frequency from one zone to the next, it does reduce the available data tracks on the storage medium.

As shown, in prior art, the user data is written in the data tracks outside the transition zones, whereas user data is not written in the data tracks within the transition zone. In this manner, the format complexity of accounting for twice the number of servo sectors within the transition zone is avoided. As illustrated in FIG. 2D, the head 22 comprises a read element 40 and a write element 42 separated by a radial offset, and the transition zone shown in FIG. 2B is at least as wide as the radial offset between the read element and write element. This embodiment may help ensure both the read element 40 and the write element 42 are within the same servo zone when performing an access operation (write or read) of a data track.

The data tracks may also be banded together to define data zones, wherein the user data rate is increased toward the outer diameter zones in order to improve the format efficiency. The number of data zones may equal the number of servo zones, or the number of data zones may be less than or greater than the number of servo zones. The boundaries of the data zones may align with the boundary of a servo zone, or the data zone boundaries may be located at radial locations different from the boundaries of the servo zones.

In the prior art example shown, any suitable timing control loop, such as a phase locked loop (PLL), may be employed that is capable of adjusting the servo channel's data rate when crossing the transition zone. When transitioning between servo zones, a center frequency or channel frequency of the timing control loop may be adjusted to substantially match the servo data rate of the next servo zone. Corresponding adjustments may also be made to the servo gate and sync window of the servo controller. For example, a control signal may switch to a fixed rate clock for timing the servo gate and sync window during the servo zone transition, or the control signal may make a suitable adjustment to counters within a signal generator in order to account for any transient in the disk locked clock caused by adjusting the center frequency.

In this disclosure, the format efficiency of the servo format may be improved by continuously varying the servo data rate or frequency from track-to-track across the radius of the disk and, in some configurations, the (interleaved) transition zones are eliminated. More specifically, by continuously adjusting the servo frequency across the stroke of the head, there are no adjacent track frequency adjustments that exceed the channel timing range, even across adjacent servo zones. In some configurations, coarse frequency changes may be managed at a servo zone level with much smaller granular frequency steps from adjacent track-to-track. Continuous frequency servo may reduce signal-to-noise ratio (SNR) fluctuations across the stroke using more constant linear density, such as measured by kilo flux change per inch (kFCI), for format efficiency. Continuous frequency servo may also reduce blanking during servo writing by eliminating a larger interleave seam used in prior servo formats at each servo zone boundary, including the butterfly seam. Improved channel electronics may support frequency granularity to enable track-to-track pattern alignment and ensure that frequency settles fast enough from track-to-track during the servo writing process. One way to achieve a fine frequency change when writing such a pattern is to ensure that the number of clock cycles between servo-zones only changes by one clock between neighboring tracks. As a result of continuously adjusting the servo frequency across the stroke, the servo pattern misalignment from track to track due to frequency changes is negligible.

In some configurations, servo decoding may be based on a two-step process for setting the channel frequency for a particular target track. The data storage device may be configured with a number of servo zones, such as four or more zones, that each include a coarse center frequency setting for the data tracks in that zone. For example, firmware may divide the storage medium surface into four or six zones from outer diameter (OD) to inner diameter (ID). In an example configuration, a radius ratio $r_{OD}/r_{ID}=1.85/0.735=2.52$. If the channel can lock with a +/−13% frequency range, then using a 4-zone configuration covers $1.26^4=2.52$ frequency ratio across the stroke. If the channel can detect +/−8.5% frequency range, then a 6-zone configuration covers $1.17^6=2.57$ frequency ratio across the stroke. Using a servo sync search mode that uses >=two wedges to establish coarse wedge-to-wedge time (w2 wt) may enable frequency lock with the disk locked clock (DLC). This may provide sufficient timing for reading the track identifier and updating the channel frequency for the known (from servo format) data rate for that track. For example, assuming a drive has 600,000 servo tracks, a seek at 500 tracks per sample has 0.077% frequency change on average ($1.00077^{\wedge}$ (600,000 total tracks/500 track per samples)=2.52). The channel may be capable of updating with a more accurate clock using the nominal frequency for the track and then detecting the frequency for the track being followed.

Note that the continuously varying frequency may have a step size between adjacent tracks based on the total number of servo tracks, a desired frequency range based on the geometry of the disk, nominal frequency range of the channel, and the granularity of the central frequency parameter of the channel. For example, with 600,000 total tracks and +/−12.5% around a nominal channel frequency, the frequency step size per track would be on the order of $4 \times 10^{-7}$. Using coarse frequency changes by zone, the frequency range may be expanded. Further, the frequency range from ID to OD may not be evenly distributed across the servo tracks due to the relationship between radial distance and track length. In some configurations, the effective step size may be limited by the granularity of the channel frequency setting and may result in some adjacent tracks being banded with the same effective servo track frequency (though the timing circuit may still compensate for their actual servo track frequency even if the center frequency of the timing control circuit cannot be further adjusted). For example, servo tracks may be banded with equal effective servo track frequencies in bands of 1,000 tracks or less. The effective step size of the track-to-track variation in frequency may be in a range that is greater than 0 and less than 0.005 of the nominal channel frequency and/or any selected central frequency.

Figure 1B:
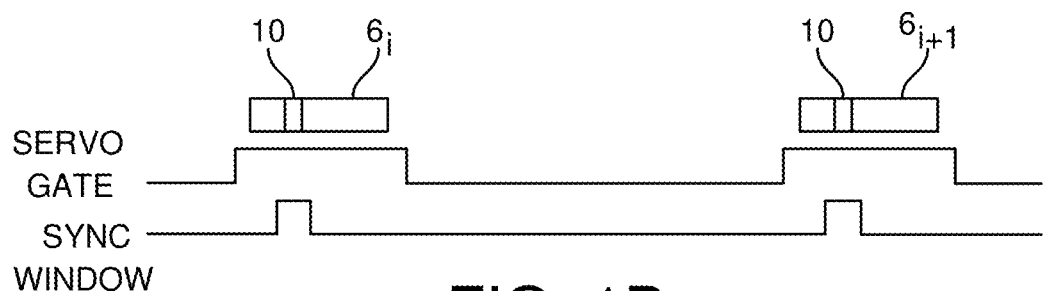
FIG. 1B is a diagram of prior art servo timing signals, including a servo gate and sync window.
Figure 3:
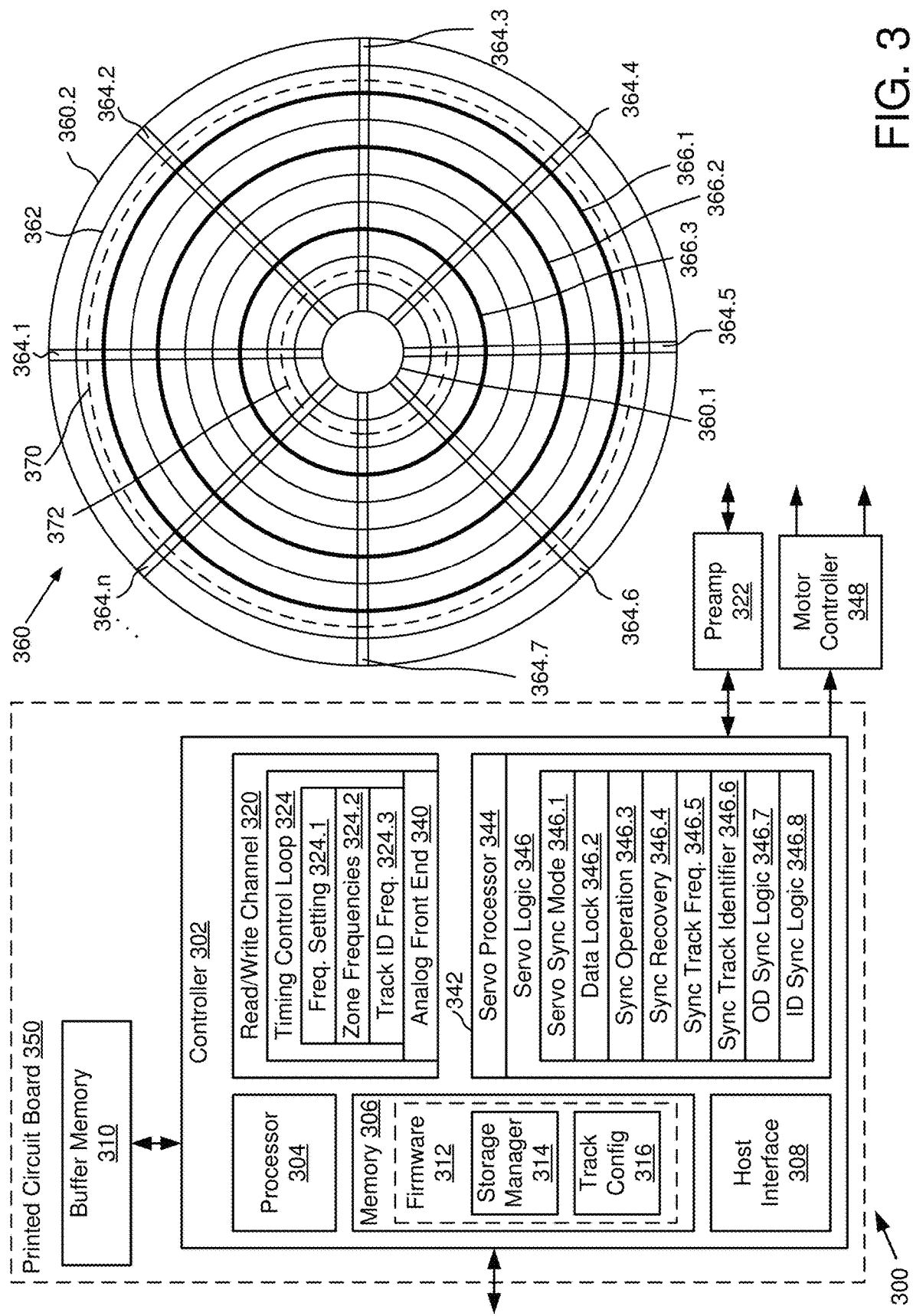
FIG. 3 is a block diagram of a configuration of data storage device including control circuitry and a storage medium format for using continuously varying servo frequencies.

FIG. 3 shows a portion of example control circuitry 300 and a storage medium 360 for a data storage device, such as a hard disk drive (HDD). In the example shown, control circuitry 300 may include one or more hardware controllers. Controller 302 may comprise a storage device controller configured to receive host storage commands, process storage operations for writing, reading, and managing data stored to non-volatile storage media in the disk drive, such as the magnetic media disk of storage medium 360 or FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or submodules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read heads over a desired track on the storage medium, applying a read voltage to the read head through preamp 322, receiving the read data in read/write channel 320, decoding the read data from the read head into decoded bit data returned to storage manager 314 (and/or buffer memory 310). Servo controller 342 may use a combination of track seek operations and track follow operations based on servo tracks to position the head for reading and writing of host data on data tracks.

Controller firmware 312 may include a track configuration 316 based on how the storage medium has been configured for data storage. Track configuration 316 may include a combination of servo formatting and data track formatting. Track configuration 316 may describe the servo and data track formatting of storage medium 360. For example, storage medium 360 may be configured with a servo format using a servo writing process that writes the servo sectors to the storage medium during a manufacturing process. The data track format may then be configured in relation to the servo format, but may not include one-to-one mapping of data tracks to servo tracks. For example, the servo format may define concentric servo tracks 362 defined by servo sectors 364.1-364.$n$. Servo sectors 364 and corresponding servo tracks 362 may have varying data rates selected to more fully utilize the different track lengths and speeds from the inner diameter (ID) 360.1 to outer diameter (OD) 360.2 of the spinning disk. Data tracks may be configured in track configuration 316 to overlay the servo tracks with data track formatting as either concentric tracks, where each track forms a distinct ring with a starting and ending point on the same circumference, or continuous tracks, where the tracks form a continuous spiral with start and end positions that are not on the same circumference, and may support different track densities and track zones relative to the servo format. Track configuration 316 may be stored in a set of media configuration parameters for the servo and data track formats.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host.

In some configurations, read/write channel 320 may include an analog front end 340 configured to receive the analog read signal from preamp 322 and convert it into a digital read signal for processing by other components of read/write channel 320. For example, analog front end 340 may include an analog-digital converter (ADC), timing circuit, and one or more filters, equalizers, and/or other signal conditioning components for generating the digital read data. In some configurations, analog front end 340 and/or other components of read/write channel 320 may support operations of servo controller 342. For example, the read signal received through preamp 322 and analog front end 340 may provide the servo read signal based on the read head response generated when the head passes over servo sectors 364 during track seek, track follow, and other servo operations.

In some configurations, channel 320 may include a timing control loop 324 configured to synchronize the read channel with the data rate to determine digital data samples from the analog read signal for further processing by read/write channel 320 and/or servo controller 342. For example, timing control loop 324 may use a phase locked loop to synchronize to the frequency and phase of the analog read signal to control the ADC sampling of analog front end 340. Timing control loop 324 may use a channel frequency setting 324.1 to determine a center frequency of timing control loop 324. The center frequency may be configured to be the most likely or target frequency for a synchronization operation around which the timing control loop 324 adjusts based on control loop feedback. In some configurations, the PLL may receive expected samples for a target response from the ADC and use phase error and suitable compensation filters to generate a control signal to adjust the center frequency for synchronizing a disk locked clock. The adjusted frequency from the disk locked clock may be fed back to the ADC and continue to adjust until synchronization is achieved. In some configurations, servo gate and sync windows for servo controller 342 may be determined from timing control loop 324. In other configurations, timing control loop 324 may comprise a fixed rate sampling clock, such as a clock that oversamples at a multiple of a nominal baud rate of channel 320, with an interpolator for generating sample values and timing the servo gate and sync window.

In some configurations, timing control loop 324 may be configured to change channel frequency setting 324.1 during track seek and servo track synchronization to adjust for the continuously varying frequencies of the servo tracks. For example, as the radial position of the head changes across the sweep from OD 360.2 to ID 360.1, the data rate and corresponding servo frequency may continuously decrease and the central frequency may be proactively adjusted based on the radial position of the target servo track. In some configurations, a set of zone frequencies 324.2 may be mapped to servo zones to provide an initial or coarse frequency adjustment like in a traditional zoned servo system. For example, storage medium 360 may be divided into four servo zones from OD 360.2 to ID 360.1 based on servo zone boundaries 366. In the example shown, a first servo zone may be defined between OD 360.2 and zone boundary 366.1 and have a corresponding coarse frequency value, where each servo track within that zone has a servo track frequency that is within the frequency lock range of the channel operating with the coarse frequency value for that zone. A second servo zone may be defined between servo zone boundaries 366.1 and 366.2 and have a different coarse frequency value. A third servo zone may be defined between servo zone boundaries 366.2 and 366.3 and have still another coarse frequency value. A fourth servo zone may be defined between servo zone boundary 366.3 and ID 360.1 and have still another coarse frequency value. Each servo zone includes a set of servo tracks on the order of 10,000 or more and the servo tracks in each set may have continuously varying track frequencies across a frequency range defined for that servo zone. Timing control loop 324 and/or servo controller 342 may access or interface with logic or a data structure for determining the servo zones being traversed in a seek operation and the target servo zone for a target servo track. For example, a lookup table or mapping equation may map radial positions on storage medium 360 to their respective servo zones and coarse frequency values.

In some configurations, servo track frequencies may be mapped to track numbers, track addresses, or similar track identifiers, such as the track numbers written to the servo data in each servo sector. For example, the track identifier of the target servo track may be used to determine the servo track frequency for that track and the channel frequency may be updated to use the track frequency to follow the track. In some configurations, during or following the servo writing process, the servo frequency may be determined for each servo track as a track identifier (ID) frequency 324.3. During a seek operation and/or after an initial frequency sync and data lock, the center frequency of the channel may be set to servo track ID frequency 324.3 to better center operation of the phase locked loop on the nominal frequency of the target servo track. In some configurations, the channel frequency may initially be set to the zone frequency for the target servo track and, following initial data lock and verification of the target track number, the channel frequency may be updated to the corresponding track ID frequency 324.3. Track follow operation of the timing control loop may be based on the PLL operating with the center frequency set to the servo track frequency for the target track.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342 through channel 320. Servo controller 342 may provide servo control signals to motor controller 348 and motor controller 348 may control one or more actuator VCMs and/or a spindle motor for rotating the disk stack.

In some configurations, servo logic 346 may include a servo synchronization search mode 346.1 configured to determine when track timing is synchronized with timing control loop 324 to trigger servo gate and servo synchronization. For example, servo synch search mode 346.1 may be triggered during track seek to determine coarse position data and timing from the servo sectors. In some configurations, servo synch search mode 346.1 may be configured to use at least two consecutive servo sectors for establishing channel timing. For example, the wedge-to-wedge timing may be determined based on two or more consecutive servo sectors to assist with DLC calculation and channel timing lock.

Servo logic 346 may include a data lock 346.2 configured to trigger when servo gate and servo synchronization enable a timing lock on the servo data in the servo sector. Data lock 346.2 may be a servo controller condition that indicates that servo data, such as servo and/or wedge identifiers may be read from the servo sectors. In some configurations, establishing data lock 346.2 may allow reading of servo data but may not correlate to an ideal synchronization for ongoing reliability and track follow operations. For example, data lock 346.2 may indicate that a track identifier can be read for the servo sector and used to provide an updated track frequency (e.g., track identifier frequency 324.3) to timing control loop 324.

Servo logic 346 may include initial synchronization and resynchronization logic for determining an initial position over storage medium 360 and from which subsequent servo control may be managed. In some configurations, servo synchronization logic may include initial synchronization operation 346.3 to be used when heads are loaded from being parked off-disk on a ramp and synchronization recovery operation 346.4 to be used when synchronization is lost while the heads are over the disk. Either synchronization operation 346.3 or 346.4 may be based on locating a synchronization track with a known location on storage medium 360. For example, storage medium 360 may be configured with first synchronization track 370 with a known radial or sweep distance from OD 360.2 and/or a corresponding ramp off the disk. In some configurations, storage medium 360 may be configured with a second or re-synchronization track 372 having a known radial or sweep distance from ID 360.1 and/or a corresponding ID crash stop. Each synch track (if there is more than one) may have a sync track frequency 346.5 and a sync track identifier 346.6 (or range of sync track identifiers for a sync track band). Sync track frequency 346.5 and sync track identifier 346.6 may be configured similarly to other servo tracks and, in some configurations, may be indistinguishable from other servo tracks other than their selection as a defined frequency and position to synchronize servo operations. In some configurations, different logic may be used depending on whether synchronization is being preformed from an unloaded state (i.e., the head is parked on a ramp at OD 360.2) or a loaded state (i.e., the head is in an unknown position over the disk). For example, if the heads are in an unloaded state, OD synchronization logic 346.7 may be preferred and, if the heads are in a loaded state, ID synchronization logic 346.8 may be preferred. Note that it may be possible to unload the heads from the disk to allow use of OD sync logic 346.7 or, conversely, to push the heads from any disk position or even the unloaded position to the ID crash stop to use ID sync logic 346.8. OD sync logic 346.7 and ID sync logic 346.8 may be further described below with regard to FIGS. 4A and 4B.

Figure 4A:
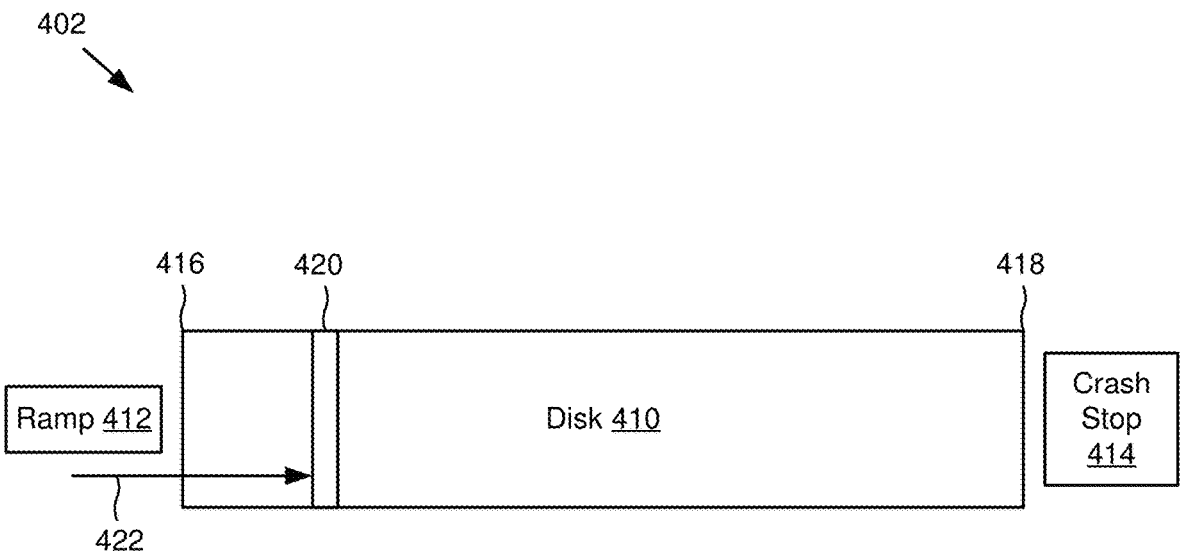
FIGS. 4A and 4B are block diagrams of example frequency synchronization configurations.
Figure 4B:
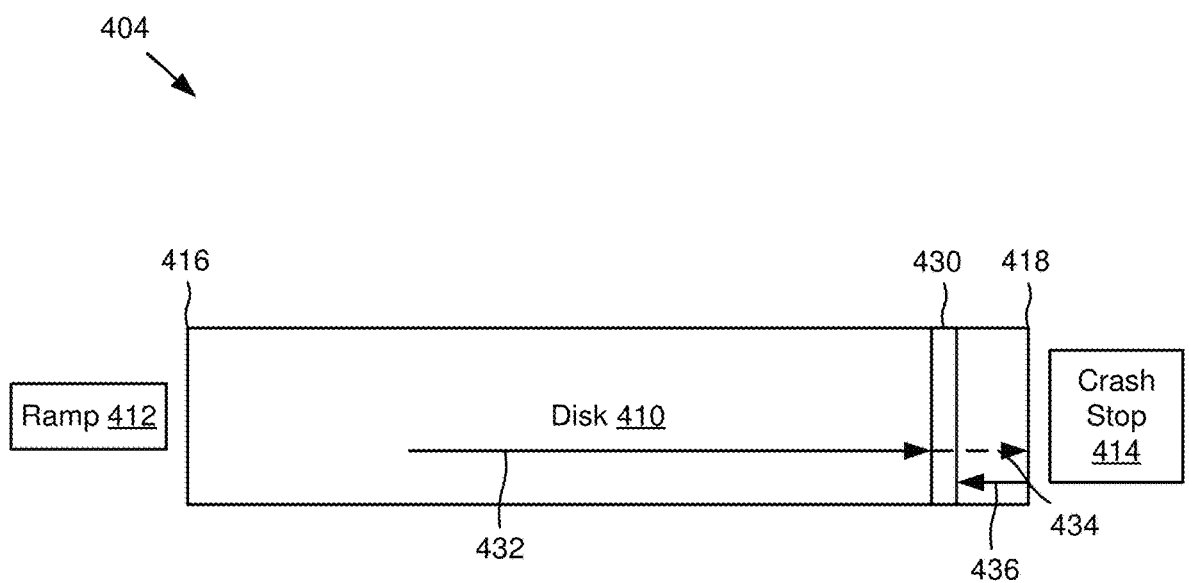

FIGS. 4A and 4B show servo synchronization operations that may be used in conjunction with control circuitry 300. More specifically, FIG. 4A shows an OD sync operation 402 and FIG. 4B shows an ID sync operation 404. In FIGS. 4A and 4B, a portion of a rotating disk 410 is shown as a rectangular cutaway from above the storage medium surface. A ramp 412 is shown adjacent OD 416 and a crash stop 414 is shown adjacent ID 418. The various components have been stylized as rectangles for simplicity and the curvature of OD 416, ID 418, and synchronization tracks 420 and 430 have been omitted. Similarly, none of the elements are to scale, most notably the width of synchronization tracks 420 and 430 relative to the disk size from OD 416 to ID 418. Arrows 422, 432, and 434 show idealized movement of the head in the cross-track direction along the surface of disk 410.

FIG. 4A shows OD synchronization operation 402 that can be used to locate and synchronize servo operations from a starting position on ramp 412 (unloaded from disk 410). For example, synchronization operation 402 may be used at initialization or any time the heads have been returned to ramp 412, such as when the data storage device is not carrying out storage or maintenance operations that involve reading from or writing to the disk or the heads are unloaded for shock protection or other reasons. Prior to initiating movement of the head, the previously stored track frequency of sync track 420 and the wedge-to-wedge timing (via modulo counters) may be determined. In some configurations, the channel frequency may be set to the track frequency and/or the coarse zone frequency for an outermost zone (including sync track 420) to improve the likelihood of successful detection of and synchronization with sync track 420. The head may be loaded onto the disk at a relatively low seek velocity, such as two inches per second, based on the control signal applied to the VCM. In some configurations, the seek velocity for the synchronization search sweep may be experimentally determined to ensure that the frequency change across tracks is within a small enough range to make it easier for the channel to detect and lock into the correct frequency. During the controlled sweep 422 from ramp 412, the channel may use a servo synchronization search mode to find a threshold number of servo address marks (SAMs) in the servo sectors having the correct band or frequency. The channel may establish servo gate control based on the detected SAMs. For example, after four or more SAMs of the correct frequency, servo gate may be established. The channel may then operate in a windowed mode to initiate track ID detection from the servo sector data. By confirming the track identifier of the detected track matches the synchronization track identifier, the servo processor determines its radial position over the storage medium and may initiate normal seek operations from the synchronized starting position on sync track 420. In some configurations, sync track 420 may include a track range within a frequency tolerance range from the set center frequency for the sync track. The sweep may be intended to intercept the predetermined sync track frequency without requiring a large frequency tolerance by the channel. For example, sync track 420 may include a band of servo tracks over 1,000 tracks wide. As discussed above, the servo track ID may then allow a specific track, position, and track frequency to be determined.

FIG. 4B shows ID synchronization operation 404 that can be used to locate and synchronize servo operations from a starting position anywhere on disk 410. For example, synchronization operation 404 may be used any time servo synchronization is lost over the storage medium surface and may be preferable to having to unload the heads from the disk to use OD synchronization operation 402. In some configurations, prior to initiating movement of the head, the channel frequency may be set to the servo zone frequency of the innermost (ID) servo zone and the channel frequency may be slowly increased during the sweep operation to accelerate the intercept point with sync track 430 (which may be any track that successfully syncs with the channel frequency at that time). Alternatively, a fixed sync track or sync track band may be used (similar sync track 420) and the previously stored track frequency for sync track 430 and the wedge-to-wedge timing (via modulo counters) may be determined. From the point of the fatal servo error (current but unknown position of the head), the head may be swept in the direction of sync track 430 and ID crash stop 414 in controlled sweep 432. Note that if the current position is inside of sync track 430, the operation may be completed as if the frequency sync was missed on the inward sweep path (see below). The VCM bias current may be set to push the head toward the ID and, as described for controlled sweep 422, controlled sweep 432 may use a relatively low velocity to increase the likelihood of sync detection. As the head moves toward the ID, the servo synchronization search mode described above may be used to detect SAMs and track identifiers to re-synchronize the servo control with a known location. If successful sync up is not achieved by the time the head reaches ID 418, controlled sweep 432 fails to detect sync track 430 on the inward pass to continue on path 434, and crash stop 414 ends the inward controlled sweep of 432 and 434, the channel frequency may be set to the track frequency of sync track 430. Controlled sweep 436 may continue the servo synchronization search in the OD direction until sync track 430 is detected. As discussed above, the servo track ID for sync track 430 (or another servo track successfully detected) may then allow a specific track, position, and track frequency to be determined for returning to normal servo operations.

Figure 5:
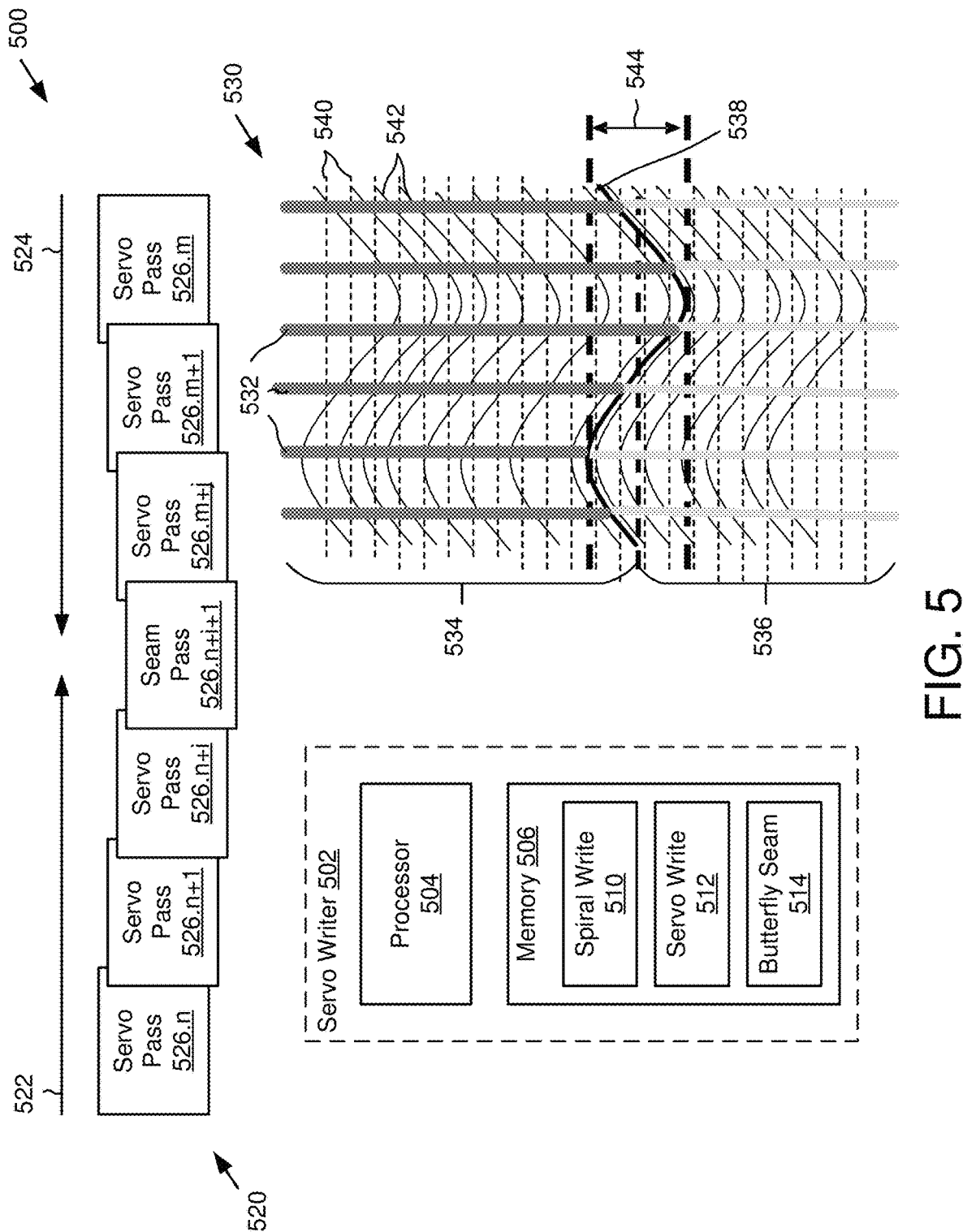
FIG. 5 is a block diagram of an example servo writer system for a butterfly seam configuration to support the storage medium format of the data storage device of FIG. 3.

As shown in FIG. 5, a servo writer system 500 may write servo tracks as shown at 520 to generate a butterfly seam configuration 530 to support the storage medium format and control circuitry operations to use the preferred edge of the write head to write a higher quality servo pattern of the data storage device of FIG. 3. For example, a servo writer 502 may be configured to write the servo pattern described for storage medium 360 in FIG. 3 prior to the data storage device being put into operation for storing host data. In some configurations, servo writer 502 may include a processor 504 and a memory 506 for executing the logical or software instructions for the servo writing process. For example, a self servo writing process may include some or all of the servo writing operations being executed using the control circuitry of the data storage device, such as control circuitry 300. In some configurations, one or more external computing systems may be used to assist with the servo writing process. Instructions for completing the servo writing purpose may be stored in one or more memories, such as memory 506, for execution by one or more processors, such as processor 504. These instructions may include functions, procedures, interfaces, and/or data structures for carrying out the operations described herein.

In some configurations, servo writer 502 may include a spiral write operation 510 configured to write an initial set of guide spirals across the surface of the storage medium. For example, a spiral copy process may use a spiral copy velocity of less than 30 tracks per sample and maintain a constant frequency for the spiral pattern. The detection of the concentric servo when writing the spiral pattern may be within the adjustment and setting range of the timing control loop. Therefore, concentric servo may be decoded while writing the spiral pattern at a constant frequency spiral.

In some configurations, servo writer 502 may include a servo write operation 512 configured to write the servo sectors corresponding to servo tracks having a desired servo pattern. For example, servo write operation 512 may write the servo tracks with continuously varying frequencies across adjacent tracks, which may be grouped into servo zones having sets of tracks in a defined frequency range. In some configurations, servo write operation 520 may use a bidirectional writing approach as shown at 520. Servo tracks may be written to the storage medium in two passes, where two adjacent writes at half-track spacings write each servo track. In a first direction 522, servo tracks from the OD to the seam are written in servo write passes 526.$n$ to 526.$n$+i. In a second direction 524, servo tracks from the ID to the seam are written in servo write passes 526.$m$ to 526.$m$+j. The final "track" is not a regular track but a butterfly seam written in seam pass 526.$n$+i+1 and further described with regard to butterfly seam configuration 530.

Butterfly seam configuration 530 shows an example butterfly seam 538 where servo wedges 532 (servo sectors aligned in the cross-track direction) written at 522 and 524 meet. For example, servo passes 526.$n$-526.$n$+I may write servo tracks 534 in first direction 522 and servo passes 526.$m$-526.$m$+j may write servo tracks 536 in second direction 524. In some configurations, butterfly seam 538 may comprise Gray code written at writer width, rather than the servo track pitch or half step and may not include null bursts to support track follow feedback control use. As a result, servo may not track follow on butterfly seam 538. The servo controller may be configured to jump a pre-calibrated distance across the seam from servo tracks 534 to servo tracks 536 without using the PES for feedback control during the jump. In some configurations, the butterfly seam 538 may be 1F with a peak-to-peak amplitude 544. Servo tracks 540 may be written with the same Gray code but continuously varying frequencies from track to track, and also with a down-track 1F frequency modulation. The purpose is such that when the data track circularizes to remove the 1F sinusoidal path, only about one track along the circular data track path 542 has residual artifacts due to the butterfly seam 538 as opposed to the peak-to-peak circular area 544; Additionally, data tracks 542 may cross servo tracks with no unwanted eccentricity that could require 1F control efforts to track follow in the cross-track direction or servo frequency change from wedge-to-wedge in the down-track direction. By using one set of concentric servo patterns in the down-track direction without using the interleaved servo pattern in the traditional 4-zone servo, more space is available for the spiral pattern in spiral write operation 510. This may reduce the likelihood of having two or more successive servo wedges without the full or partial spiral pattern, which may otherwise result in servo blanking. We note that although here we say circularizing around a 1F sinusoidal path, the same principle extends to other ways of letting the data track traverse across the servo track for data track squeeze mitigation, such as a triangular dither path.

Figure 6:
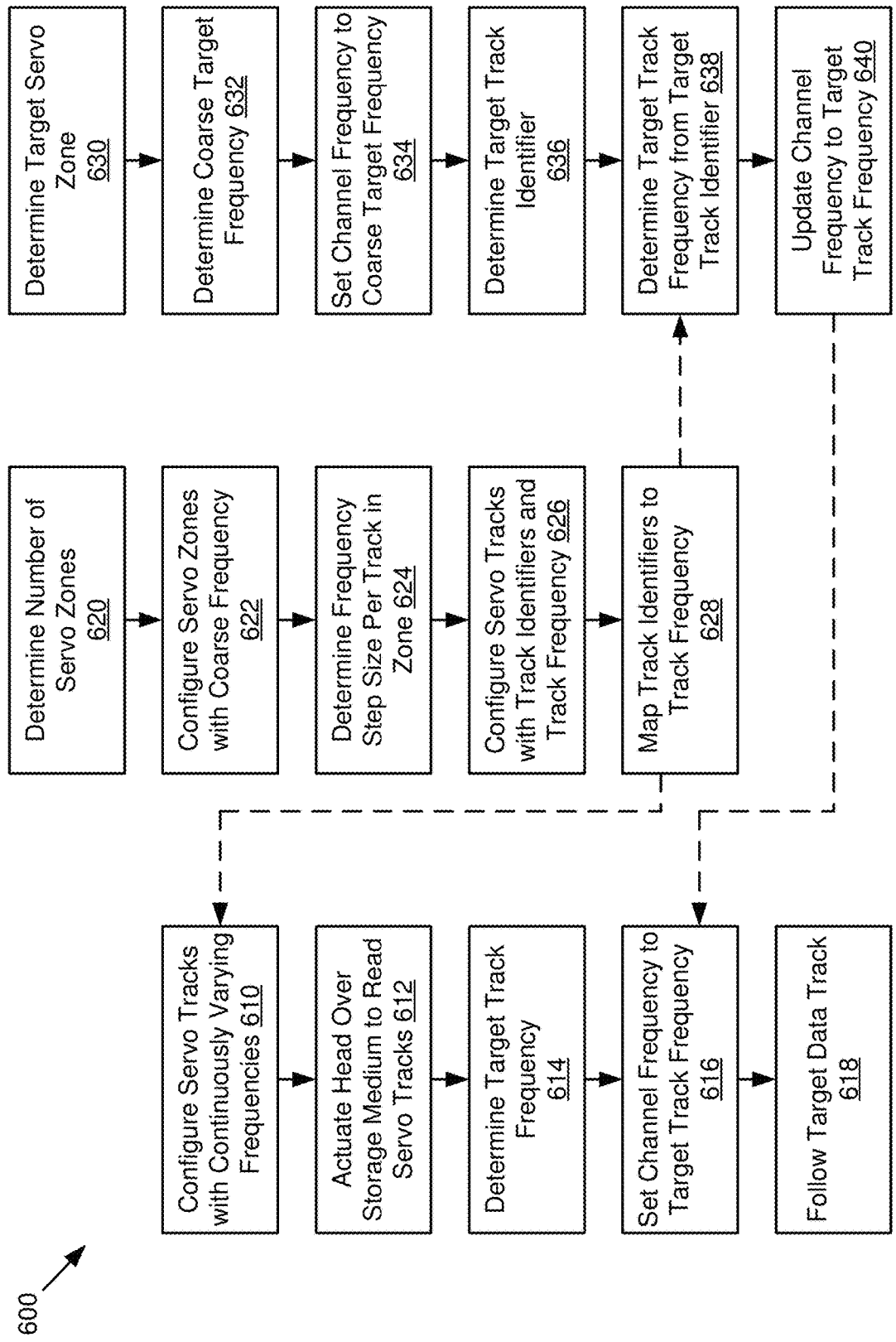
FIGS. 6A, 6B, and 6C are an example method of servoing on servo tracks with continuously varying frequencies.

As shown in FIGS. 6A-6C, control circuitry 300 may be operated with storage medium 360, according to an example method of servoing on servo tracks with continuously varying frequencies, i.e., according to the method 600 illustrated by blocks 610-540.

At block 610, servo tracks may be configured with continuously varying frequencies. For example, the frequencies of individual servo tracks and/or bands of servo tracks may consistently vary from the OD to the ID of the storage medium. An example configuration method is further described with regard to FIG. 6B and blocks 620-628.

At block 612, the head of the data storage device may be actuated over the storage medium to read the servo tracks. For example, the head may respond to the servo sectors on the spinning storage medium to generate a read signal to the analog front end of a read channel.

At block 614, a target track frequency may be determined. For example, based on the radial position of the target track, the servo controller and/or channel may determine a center frequency value within a frequency lock range of the target track frequency may be determined from target servo track and/or servo zone logic.

At block 616, the channel frequency may be set to the target track frequency. For example, the channel may set the center frequency to the target track frequency based on the track identifier. An example method of setting the channel frequency to the target track frequency is further described with regard to FIG. 6C and blocks 630-640.

At block 618, the head may follow the target data track based on the target servo track number, which has a corresponding frequency. The frequency is determined by how many clock counts are allocated from one wedge to the next on each product servo track. For example, servo control may track follow for a desired data track using the servo track frequency of the servo track (or servo tracks) corresponding to the data track.

At block 620, a number of servo zoned may be determined. For example, the servo format for the data storage device may be configured to include four, six, or more servo zones for grouping sets of servo tracks in various concentric bands on the storage medium.

At block 622, servo zones may be configured with coarse servo frequency values. For example, the servo format may define a frequency range for the set of servo tracks in that zone and determine a center frequency that is within the frequency lock range of all of the servo track frequencies in that zone, where that center frequency is coarse frequency value for that zone.

At block 624, a frequency step size per track may be determined for each zone. For example, the servo format for each zone may include a different frequency range and distribution of constantly varying frequencies across the set of servo tracks in that zone.

At block 626, servo tracks may be configured with servo track identifiers and servo track frequencies. For example, when each servo track is written, it may be written at a selected servo track frequency and include a unique servo track identifier in the servo sector data.

At block 628, servo track identifiers may be mapped to servo track frequencies. For example, based on the servo format, the servo controller and/or channel may be configured with logic and/or a lookup table mapping servo track identifiers to corresponding servo track frequencies for determining servo track frequency from the servo track identifier for that servo track.

At block 630, a target servo zone may be determined. For example, the servo controller may determine the servo zone in which a target servo track is configured based on the servo track identifier corresponding to the destination data track for a storage command.

At block 632, a coarse target frequency may be determined. For example, the servo controller and/or channel may determine a course target frequency for corresponding to the target servo zone based on logic and/or a data structure mapping servo zones to coarse frequency values.

At block 634, channel frequency may be set to the coarse target frequency. For example, the channel may set the center frequency of the channel timing loop to the coarse frequency value for the target servo sector.

At block 636, a target track address may be determined. For example, the servo controller may determine the target track address based on the target data track and confirm from reading the servo track address from the servo sector (using frequency lock from the coarse target frequency) that the head is now positioned over the target servo track.

At block 638, a target track frequency may be determined from the target track identifier. For example, the servo controller and/or channel may use the confirmed servo track identifier and mapping of track identifiers to track frequencies (from block 628) to determine the target track frequency of the target servo track.

At block 640, the channel frequency may be updated to the target track frequency. For example, the channel may set the center frequency of the channel timing loop to the target track frequency value for the target servo track.

Figure 7:
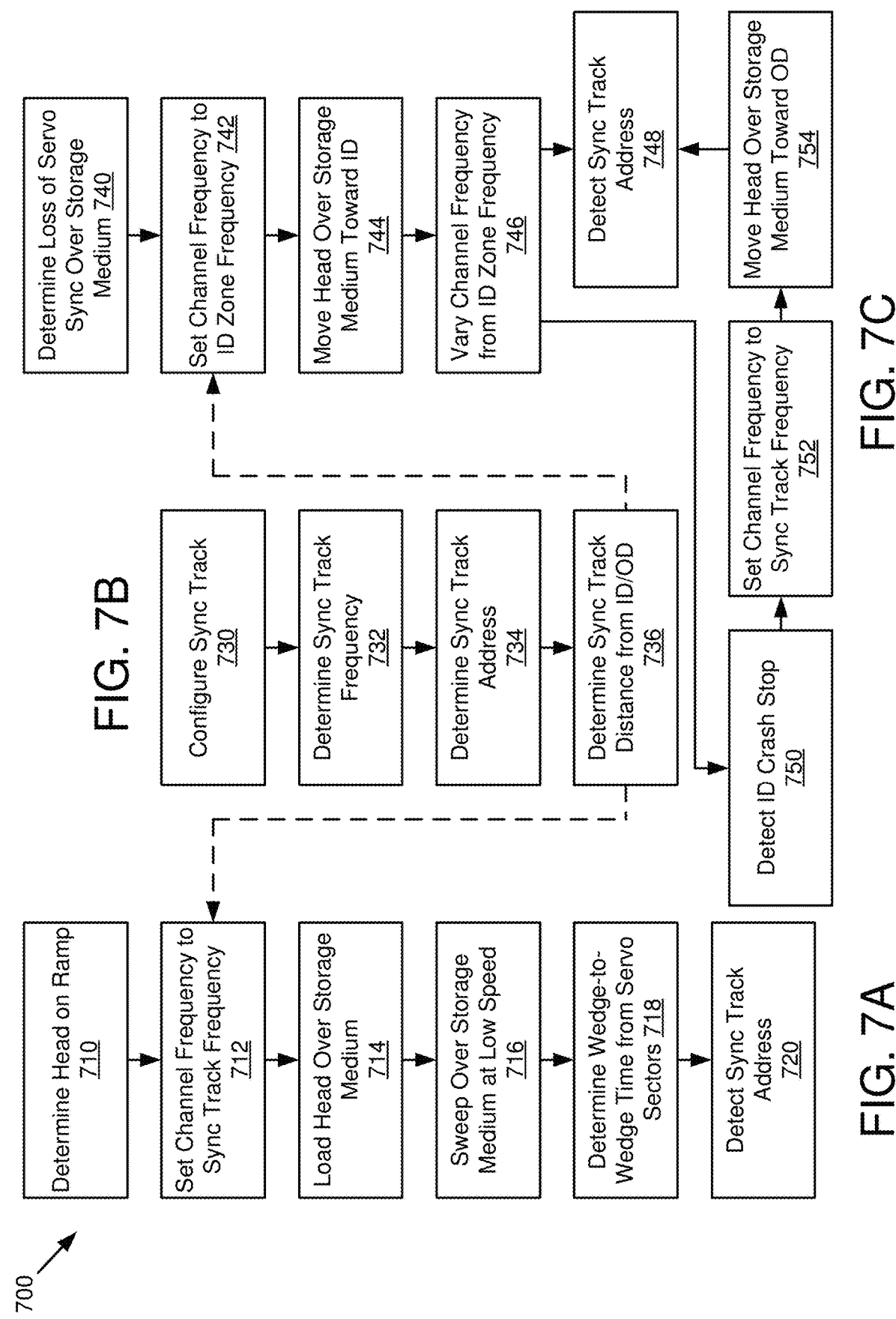
FIGS. 7A, 7B, and 7C are an example method of initiating and/or recovering servo synchronization on servo tracks with continuously varying frequencies.

As shown in FIG. 7A-7C, control circuitry 300 may be operated with storage medium 360 according to an example method of initiating and/or recovering servo synchronization on servo tracks with continuously varying frequencies, i.e., according to the method 700 illustrated by blocks 710-754.

At block 710, determine that the head is parked on the ramp. For example, at various points during data storage device operation, the head may be offloaded from the storage medium to a ramp adjacent the outer diameter of the storage medium.

At block 712, the channel frequency may be set to a synchronization track frequency. For example, a sync track may be configured or selected with a servo track frequency that may be used as a sync track frequency. An example method of configuring sync tracks is further described with regard to FIG. 7B and blocks 730-736.

At block 714, the head may be loaded over the storage medium. For example, the servo controller may initiate a head load operation by providing a control signal to the VCM to release and move the head off the ramp.

At block 716, a sweep may be initiated over the storage medium at a low speed. For example, the storage controller may provide a control signal to the VCM for a relatively slow sweep from the OD inward using a servo synchronization search mode and waiting for the channel to establish synchronization with the sync track based on the sync track frequency.

At block 718, wedge-to-wedge timing may be determined from the servo sectors. For example, the servo synchronization search mode may be configured to use at least two consecutive servo sectors (from adjacent servo wedges) to establish initial wedge-to-wedge timing for synchronization.

At block 720, a sync address may be determined. For example, when servo tracks within the frequency lock range of the channel from the sync track frequency are reached, the channel may use a windowing mode to determine the servo track identifiers and compare them to the target sync track address until the sync track is found.

At block 730, a synchronization track is configured. For example, a specific servo track and/or band of servo tracks in the OD servo zone may be selected for use as a synch track.

At block 732, a synchronization track frequency may be determined for the sync track. For example, the selected servo track or band of servo tracks may be mapped to servo track frequencies in the servo format and one of those servo track frequencies may be selected as the sync track frequency.

At block 734, a sync track address may be determined. For example, the selected servo track or band of servo tracks may be mapped to servo track identifiers and one of those servo track identifiers may be selected as the sync track address.

At block 736, a sync track distance may be determined from the ID or OD. For example, the sync track may be selected for its radial distance relative to the OD or ID of the storage medium and, in some configurations, multiple sync tracks may be configured to include at least one sync track in the OD servo zone and one sync track in the ID servo zone. An OD sync track may be used for blocks 710-720 in FIG. 7A and an ID sync track may be used for blocks 740-754 in FIG. 7C.

At block 740, loss of servo synchronization over the storage medium may be determined. For example, the servo controller and/or channel may determine that servo synchronization has been lost while the heads are loaded over the storage medium, such as due to a shock event or other error.

At block 742, the channel frequency may be set to the inner diameter zone frequency. For example, the channel may set the center frequency of the channel timing loop to the coarse frequency value of the ID servo zone as a base servo synchronization frequency value.

At block 744, the head may be moved over the storage medium toward the inner diameter. For example, the servo controller may initiate a controlled sweep over the storage medium at low speed with the servo synchronization search mode.

At block 746, the channel frequency may be varied from the inner diameter servo zone frequency. For example, as the head sweeps closer to the ID, the channel may slowly increase the center frequency of the channel timing loop to search for a successful servo track synchronization.

At block 748, a sync track address may be detected. For example, during the servo synchronization search mode a combination of channel frequency and servo track within the frequency lock range of that channel frequency may result in successful servo frequency and data lock to read servo track identifiers from the servo sectors to reestablish servo synchronization.

At block 750, no synchronization to a servo track may be achieved prior to detecting the inner diameter crash stop. For example, the servo controller may detect contact with the inner diameter crash stop prior to receiving a successful servo synchronization from the channel.

At block 752, the channel frequency may be set to the synchronization track frequency. For example, a sync track in the ID servo zone may be used to set the center frequency of the channel timing loop.

At block 754, the head may be moved over the storage medium toward the outer diameter. For example, the servo controller may initiate a controlled sweep away from the ID crash stop at low speed using the servo synchronization search mode to attempt to detect the ID servo zone sync track and proceed to block 748. If ID sync-up fails and ends up moving the actuator to the ramp instead, it goes back to block 710. Similarly, if block 720 fails and ends up moving the actuator to the ID CS instead, we go to block 740.

Figure 8:
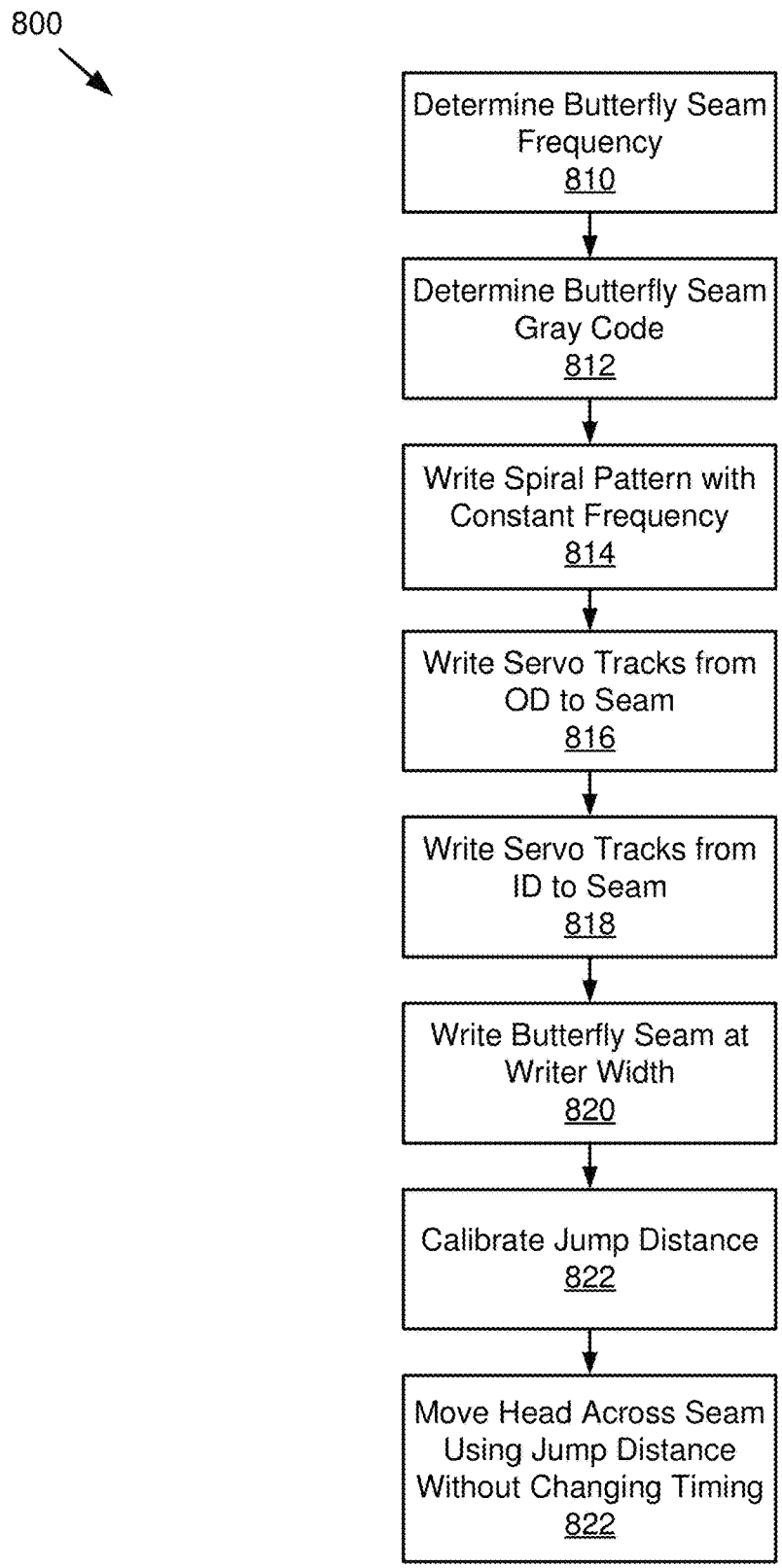
FIG. 8 is an example method of servo writing servo tracks with continuously varying frequencies using a butterfly seam that allows the head to cross the seam without changing timing.

As shown in FIG. 8, servo writer 502, which may be embodied in control circuitry 300 in some configurations, may be operated according to an example method of servo writing servo tracks with continuously varying frequencies using a butterfly seam that allows the head to cross the seam without changing timing, i.e., according to the method 800 illustrated by blocks 810-822.

At block 810, a butterfly seam frequency may be determined. For example, the butterfly seam may be configured with a 1F frequency pattern.

At block 812, a butterfly seam Gray code may be determined. For example, the butterfly seam may be configured with a Gray code selected based on the Gray codes used in the adjacent servo tracks and where the null-burst pattern of the butterfly seam is a different pattern than those used in the adjacent servo tracks.

At block 814, a spiral pattern may be written to the storage medium with a constant frequency. For example, the servo writer logic may use the write head to write a spiral servo reference pattern to the storage medium.

At block 816, servo tracks may be written from the outer diameter to the seam. For example, the servo writer logic may use the write head to write servo tracks in two passes, at a servo track pitch that is narrower than the writer width, from the OD to a seam where the OD servo tracks will meet the ID servo tracks.

At block 818, servo tracks may be written from the inner diameter to the seam. For example, the servo writer logic may use the write head to write servo tracks in two passes from the ID to the seam.

At block 820, the butterfly seam may be written at writer width. For example, the servo writer logic may use the write head to write a writer width track having the determined frequency and Gray code from blocks 810 and 812.

At block 822, a cross-track jump distance may be calibrated. For example, the servo controller may determine the width of the butterfly seam relative to the servo tracks on either side of it.

At block 824, the head may be moved across the butterfly seam using the jump distance without changing down-track timing parameters. For example, each time a seek, settle, and/or track follow operation needs to traverse the butterfly seam, the servo controller may use the jump distance to suspend timing feedback to avoid losing timing synchronization across the seam from adjacent servo tracks on one side to the adjacent servo tracks on the other.

Technology for servo formats based on continuously varying frequencies across adjacent servo tracks from the outer diameter to the inner diameter of a storage medium, including around the butterfly seam track, is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
a storage medium comprising a plurality of servo sectors defining a plurality of servo tracks, wherein a plurality of adjacent servo tracks is configured with continuously varying frequencies across the plurality of adjacent servo tracks;
a head actuated over the storage medium for reading the plurality of servo tracks; and
a control circuitry configured to:
determine, based on a radial position of a target servo track, a target track frequency from among the continuously varying frequencies;
set a channel frequency to the target track frequency; and
follow, using the target track frequency, the target servo track.

2. The data storage device of claim 1, wherein:
the storage medium further comprises a plurality of servo zones comprised of adjacent servo tracks;
the control circuitry is further configured to:
determine, based on a target servo zone for the target servo track, a coarse target frequency; and
set the channel frequency to the coarse target frequency during a seek operation for the target servo track; and
the target track frequency is within a channel phase lock range of the coarse target frequency.

3. The data storage device of claim 2, wherein:
the plurality of servo sectors for the target track includes a target track address; and
the control circuitry is further configured to:
determine, based on the target track address, the target track frequency; and
update, responsive to determining the target track address, the channel frequency to the target track frequency.

4. The data storage device of claim 3, wherein the control circuitry is further configured to map a plurality of track addresses to continuously varying frequencies within a frequency range defined for a corresponding servo zone of the plurality of servo zones.

5. The data storage device of claim 2, wherein:
the plurality of servo zones comprises at least four servo zones;
each servo zone of the plurality of servo zones has a different coarse target frequency; and
adjacent servo zones of the plurality of servo zones provide continuous user data tracks without an intervening transition zone.

6. The data storage device of claim 1, wherein the continuously varying frequencies have a step size selected from a range greater than zero and less than 0.005 of a nominal channel frequency.

7. The data storage device of claim 1, wherein the control circuitry is further configured to, during a seek operation, use at least two consecutive servo sectors to determine a wedge-to-wedge time for reading the target servo track.

8. The data storage device of claim 1, wherein:
the storage medium further comprises a first sync track having:
a first sync track frequency;
a first sync track address; and
a predetermined distance from an outer diameter of the storage medium; and
the control circuitry is further configured to, during a frequency synchronization operation:
set the channel frequency to the first sync track frequency;
load the head over the storage medium; and
sweep the head over the storage medium until the first sync track address is detected.

9. The data storage device of claim 1, wherein the control circuitry is further configured to, during a frequency synchronization recovery operation:

set the channel frequency to a base synchronization recovery frequency;
move the head over the storage medium toward an inner diameter crash stop;
sweep the head over the storage medium; and
vary the channel frequency from the base synchronization recovery frequency:
   until synchronization is established and a synchronization track address is detected; or
   the inner diameter crash stop is reached.

10. A data storage device of claim 1, wherein:
the storage medium further comprises a butterfly seam located where a set of outer diameter servo tracks and a set of inner diameter servo tracks meet;
the butterfly seam comprises gray code written at a writer width of the head and a null-burst pattern that is different from null-burst patterns of the plurality of servo tracks; and
the butterfly seam has a known frequency pattern.

11. A method comprising:
actuating a head over a storage medium for reading a plurality of servo tracks, wherein:
   the storage medium comprises a plurality of servo sectors defining the plurality of servo tracks; and
   a plurality of adjacent servo tracks is configured with continuously varying frequencies across the plurality of adjacent servo tracks; and
determining, based on a radial position of a target servo track, a target track frequency from among the continuously varying frequencies;
setting a channel frequency to the target track frequency; and
following, using the target track frequency, the target servo track.

12. The method of claim 11, further comprising:
determining, based on a target servo zone for the target servo track, a coarse target frequency, wherein the storage medium further comprises a plurality of servo zones comprised of adjacent servo tracks; and
setting a channel frequency to the coarse target frequency during a seek operation for the target servo track, wherein the target track frequency is within a channel phase lock range of the coarse target frequency.

13. The method of claim 12, further comprising:
determining, based on a target track address, the target track frequency, wherein the plurality of servo sectors for the target track includes the target track address; and
updating, responsive to determining the target track address, the channel frequency to the target track frequency.

14. The method of claim 13, further comprising:
mapping a plurality of track addresses to continuously varying frequencies within a frequency range defined for a corresponding servo zone of the plurality of servo zones.

15. The method of claim 11, wherein the continuously varying frequencies have a step size selected from a range greater than zero and less than 0.005 of a nominal channel frequency.

16. The method of claim 11, further comprising, during a seek operation:
using at least two consecutive servo sectors to determine a wedge-to-wedge time for reading the target servo track.

17. The method of claim 11, further comprising, during a frequency synchronization operation:
setting a channel frequency to a first sync track frequency, wherein the storage medium further comprises a first sync track having:
   the first sync track frequency;
   a first sync track address; and
   a predetermined distance from an outer diameter of the storage medium;
loading the head over the storage medium; and
sweeping the head over the storage medium until the first sync track address is detected.

18. The method of claim 17, further comprising, during a frequency synchronization recovery operation:
setting the channel frequency to a base synchronization recovery frequency;
moving the head over the storage medium toward an inner diameter crash stop;
sweeping the head over the storage medium; and
varying the channel frequency from the base synchronization recovery frequency:
   until synchronization is established and a synchronization track address is detected; or
   the inner diameter crash stop is reached.

19. The method of claim 11, further comprising:
moving the head across a butterfly seam on the storage medium without losing servo timing, wherein:
   the butterfly seam is located where a set of outer diameter servo tracks and a set of inner diameter servo tracks meet;
   the butterfly seam comprises gray code written at a writer width of the head and a null-burst pattern that is different from null-burst patterns of the plurality of servo tracks; and
   the butterfly seam has a known frequency pattern.

20. A data storage device comprising:
a storage medium comprising a plurality of servo sectors defining a plurality of servo tracks, wherein a plurality of adjacent servo tracks is configured with continuously varying frequencies across the plurality of adjacent servo tracks;
a head actuated over the storage medium for reading the plurality of servo tracks;
means for determining, based on a radial position of a target servo track, a target track frequency from among the continuously varying frequencies; and
means for setting a channel frequency to the target track frequency; and
means for following, using the target track frequency, the target servo track.

* * * * *